US009311768B2

(12) United States Patent
Stevens et al.

(10) Patent No.: US 9,311,768 B2
(45) **Date of Patent: *Apr. 12, 2016**

(54) GAMING SYSTEM AND A METHOD OF GAMING INCLUDING A PLURALITY OF INSTANCES OF A GAME

(75) Inventors: Christopher Michael Stevens, Lane Cove (AU); Nicholas Luke Bennett, Manly Vale (AU); Philippa Alice Graham, Clovelly (AU)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 1051 days.

This patent is subject to a terminal disclaimer.

(21) Appl. No.: 13/081,253

(22) Filed: Apr. 6, 2011

(65) Prior Publication Data

US 2011/0183743 A1 Jul. 28, 2011

Related U.S. Application Data

(63) Continuation-in-part of application No. 12/967,919, filed on Dec. 14, 2010, now Pat. No. 8,740,685.

(30) Foreign Application Priority Data

Dec. 14, 2009 (AU) ................................ 2009906075

(51) Int. Cl.

| | |
|---|---|
| ***A63F 13/00*** | (2014.01) |
| ***G07F 17/32*** | (2006.01) |
| ***A63F 3/00*** | (2006.01) |
| *G07F 17/34* | (2006.01) |

(52) U.S. Cl.

CPC ............ *G07F 17/32* (2013.01); *A63F 3/00157* (2013.01); *G07F 17/3244* (2013.01); *G07F 17/3262* (2013.01); *G07F 17/3267* (2013.01); *G07F 17/3213* (2013.01); *G07F 17/34* (2013.01)

(58) Field of Classification Search

CPC . G07F 17/32; G07F 17/3267; G07F 17/3262; G07F 17/3213; G07F 17/34; G07F 17/3244; G07F 17/3258; A63F 3/00157; A63F 1/00; A63F 2001/008; A63F 2001/003; A63F 3/0645

USPC .......................................... 463/16–21, 29–31

See application file for complete search history.

(56) References Cited

U.S. PATENT DOCUMENTS

| | | | | |
|---|---|---|---|---|
| 6,652,378 | B2 * | 11/2003 | Cannon et al. | 463/20 |
| 7,815,500 | B2 * | 10/2010 | Montross et al. | 463/13 |
| 2002/0177478 | A1 * | 11/2002 | Glasson et al. | 463/19 |
| 2007/0060247 | A1 * | 3/2007 | Low et al. | 463/16 |
| 2008/0064480 | A1 * | 3/2008 | Randall | 463/20 |
| 2008/0268935 | A1 * | 10/2008 | Acres | 463/16 |
| 2009/0124364 | A1 * | 5/2009 | Cuddy et al. | 463/27 |

FOREIGN PATENT DOCUMENTS

WO 2004078297 9/2004

* cited by examiner

*Primary Examiner* — Justin Myhr
(74) *Attorney, Agent, or Firm* — Armstrong Teasdale LLP

(57) ABSTRACT

Certain examples provide gaming systems and methods. An example gaming system includes a display and a game controller arranged to: cause the display to display a plurality of game displays in which a plurality of games will be carried out; receive a player selection of a game of the plurality of games; carry out the plurality of games in their respective game displays; and make an award upon a comparison of an outcome of the player selected game with an outcome of a non-selected game or games satisfying an award criteria.

51 Claims, 7 Drawing Sheets

GAMING SYSTEM AND A METHOD OF GAMING INCLUDING A PLURALITY OF INSTANCES OF A GAME

CROSS REFERENCE TO RELATED APPLICATIONS

The present application relates to and claims the benefit of priority from Australian Provisional Patent Application Number 2009906075, filed on Dec. 14, 2009, which is herein incorporated by reference in its entirety, and, as a continuation-in-part, from U.S. patent application Ser. No. 12/967,919, filed on Dec. 14, 2010, which is herein incorporated by reference in its entirety.

FIELD

The present invention relates to a gaming system, a method of gaming, a game controller and computer program code.

BACKGROUND

It is known to provide a gaming system such as a video slot machine wherein symbols are displayed as a plurality of virtual reels on a video display. Each reel comprises a plurality of symbols arranged in a predetermined sequence. Typically, when a reel stops, a plurality of symbols of each reel are visible on the display. For example, three symbols of each reel.

While such gaming systems provide users with enjoyment, a need exists for alternative gaming systems in order to maintain or increase player enjoyment.

BRIEF SUMMARY

In a first aspect, the invention provides a gaming system including:

a display; and a game controller arranged to:

- cause the display to display a plurality of game displays in which a plurality of games will be carried out;
- receive a player selection of a game of the plurality of games;
- carry out the plurality of games in their respective game displays; and
- make an award upon a comparison of an outcome of the player selected game with an outcome of a non-selected game or games satisfying an award criteria.

In an embodiment, the award criteria is that a prize total related to the selected game is greater than the prize total related to each of the other games.

In an embodiment, each of the games is different.

In an embodiment, each of the different games has a different volatility.

In an embodiment, the game controller carries out at least one of the plurality of games by conducting a series of game rounds.

In an embodiment, the game controller carries out a plurality of game rounds for each of the games.

In an embodiment, the game controller carries out the same number of game rounds for each game.

In an embodiment, the game controller is arranged to determine an outcome of each game by monitoring each game for occurrence of one or more designated game events.

In an embodiment, each of the games includes a spinning reel game, each game round includes a spin of the reels, the designated event is occurrence of one or more designated symbols in the symbols which are the outcome of each spin and the outcome of each game is the total number of designated symbols occurring across the game rounds of each game.

In an embodiment, the comparison is to determine whether the number of designated symbols in the selected game is greater than in respective ones of each of the non-selected games.

In an embodiment, the comparison is to determine whether the number of designated symbols in the selected game is greater than a combined number of designated symbols in the non-selected games.

In an embodiment, the game controller is further arranged to evaluate each game round of each game relative to a pay table of the respective game to determine any amount which payable based on the pay table and upon the award criteria being met, make an award corresponding to the total amount payable in respect of each of the games.

In an embodiment, there are a plurality of award criteria which may be satisfied and different awards correspond to different criteria.

In an embodiment, the game controller is arranged to make an award corresponding to the total amount payable in respect of the player selected game upon a second award criteria being met.

In an embodiment, the game controller is arranged to cause the plurality of game displays to be displayed in response to a trigger condition being met.

In an embodiment, the trigger event is one or more of:

- an occurrence of a specific symbol or symbols;
- a random occurrence related to turnover or time;
- a machine event;
- a trigger received from an external device;
- a system event;
- a condition initiated by an operator;
- a decision by a player; or
- an additional bet by a player.

In an embodiment, the gaming system includes a memory and a processor arranged to implement the game controller by executing program instructions stored in the memory.

In an embodiment, the gaming system includes a game play mechanism operable to place a wager, to initiate play and make the player selection of a game display.

In a second aspect, there is provided a game controller for a gaming system, the game controller arranged to:

- cause a display to display a plurality of game displays in which a plurality of games will be carried out;
- receive a player selection of a game;
- carry out the plurality of games and cause them to be displayed in their respective game displays; and
- make an award upon a comparison of an outcome of the player selected game with an outcome of a non-selected game or games satisfying an award criteria.

In an embodiment, the game controller includes a display controller for controlling the display to display a plurality of game displays.

In an embodiment, the game controller includes an award comparator for comparing the outcome of the player selected game with an outcome of the non-selected game or games to determine whether they satisfy the award criteria.

In an embodiment, the award criteria is that a prize total related to the selected game is greater than the prize total related to each of the other games.

In an embodiment, each of the games is different.

In an embodiment, each of the different games has a different volatility.

In an embodiment, the game controller carries out at least one of the plurality of games by conducting a series of game rounds.

In an embodiment, the game controller carries out a plurality of game rounds for each of the games.

In an embodiment, the game controller carries out the same number of game rounds for each game.

In an embodiment, the game controller includes at least one outcome evaluator arranged to determine an outcome of each game by monitoring each game for occurrence of one or more designated game events.

In an embodiment, each of the games includes a spinning reel game, each game round includes a spin of the reels, the designated event is occurrence of one or more designated symbols in the symbols which are the outcome of each spin and the outcome of each game is the total number of designated symbols occurring across the game rounds of each game.

In an embodiment, the comparison is to determine whether the number of designated symbols in the selected game is greater than in respective ones of each of the non-selected games.

In an embodiment, the comparison is to determine whether the number of designated symbols in the selected game is greater than a combined number of designated symbols in the non-selected games.

In an embodiment, the outcome evaluator is further arranged to evaluate each game round of each game relative to a pay table of the respective game to determine any amount which payable based on the pay table and upon the award criteria being met, make an award corresponding to the total amount payable in respect of each of the games.

In an embodiment, there are a plurality of award criteria which may be satisfied and different awards correspond to different criteria.

In an embodiment, the game controller is arranged to make an award corresponding to the total amount payable in respect of the player selected game upon a second award criteria being met.

In an embodiment, the game controller is arranged to cause the plurality of game displays to be displayed in response to a trigger condition being met.

In an embodiment, the trigger event is one or more of:

an occurrence of a specific symbol or symbols;

a random occurrence related to turnover or time;

a machine event;

a trigger received from an external device;

a system event;

a condition initiated by an operator;

a decision by a player; or an additional bet by a player.

In a third aspect, the invention provides a method of electronic gaming including:

- causing an electronic display to display a plurality of game displays in which a plurality of games will be carried out;
- receiving a player selection of a game of the plurality of games;
- carrying out the plurality of games in their respective game displays; and
- making an award upon a comparison of an outcome of the player selected game with an outcome of a non-selected game or games satisfying an award criteria.

In an embodiment, the award criteria is that a prize total related to the selected game is greater than the prize total related to each of the other games.

In an embodiment, each of the games is different.

In an embodiment, each of the different games has a different volatility.

In an embodiment, the method includes carrying out at least one of the plurality of games by conducting a series of game rounds.

In an embodiment, the method includes carrying out a plurality of game rounds for each of the games.

In an embodiment, the method includes carrying out the same number of game rounds for each game.

In an embodiment, the method includes determining an outcome of each game by monitoring each game for occurrence of one or more designated game events.

In an embodiment, the method each of the games includes a spinning reel game, each game round includes a spin of the reels, the designated event is occurrence of one or more designated symbols in the symbols which are the outcome of each spin and the outcome of each game is the total number of designated symbols occurring across the game rounds of each game.

In an embodiment, the comparison includes determining whether the number of designated symbols in the selected game is greater than in respective ones of each of the non-selected games.

In an embodiment, the comparison includes determining whether the number of designated symbols in the selected game is greater than a combined number of designated symbols in the non-selected games.

In an embodiment, the method includes evaluating each game round of each game relative to a pay table of the respective game to determine any amount which payable based on the pay table and upon the award criteria being met, making an award corresponding to the total amount payable in respect of each of the games.

In an embodiment, there are a plurality of award criteria which may be satisfied and different awards correspond to different criteria.

In an embodiment, the method includes making an award corresponding to the total amount payable in respect of the player selected game upon a second award criteria being met.

In an embodiment, the method includes causing the plurality of game displays to be displayed in response to a trigger condition being met.

In an embodiment, the trigger event is one or more of:

an occurrence of a specific symbol or symbols;

a random occurrence related to turnover or time;

a machine event;

a trigger received from an external device;

a system event;

a condition initiated by an operator;

a decision by a player; or an additional bet by a player.

In a fourth aspect, the invention provides a tangible computer readable storage medium including computer program code which when executed implements the above method.

BRIEF DESCRIPTION OF THE DRAWINGS

Certain embodiments of the invention will now be described in relation to the following drawings in which.

Figure 1:
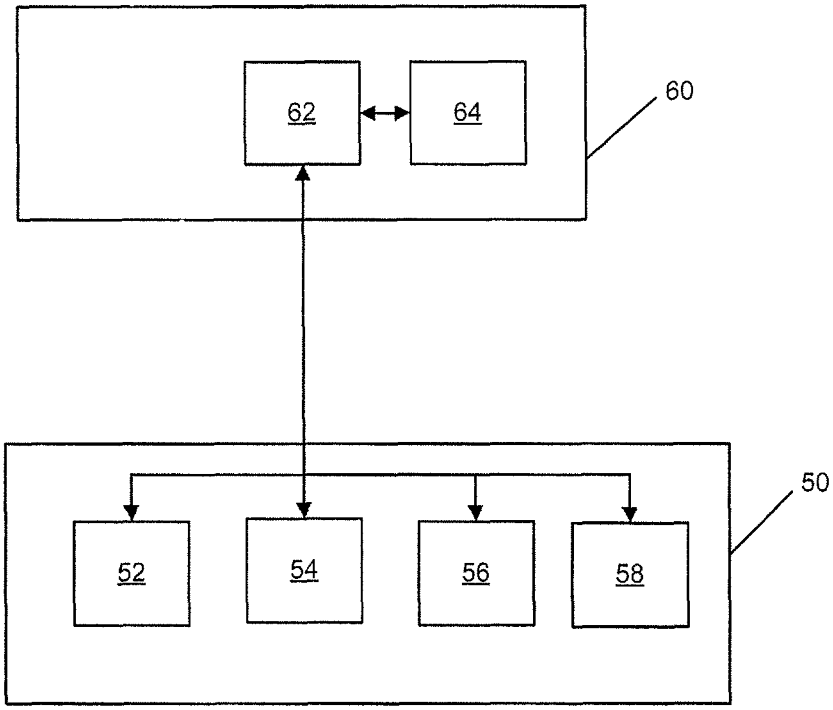
FIG. 1 is a block diagram of the core components of a gaming system.

Features, further aspects, and advantages of the present invention will become apparent from the following description of embodiments thereof, by way of example only, with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

DETAILED DESCRIPTION OF CERTAIN EXAMPLES

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended apparatus claims are read to cover a purely software and/or firmware implementation, in at least one embodiment, at least one of the elements is hereby expressly defined to include a tangible medium such as a memory, DVD, CD, etc., storing the software and/or firmware.

An example embodiment provides a gaming system with a game controller arranged to provide a game where during at least some instances of game play, for example subsequent to a trigger condition being met, the player is offered a plurality games to choose from. The games are then played concurrently in separate game displays and an award is made to the player if an award criteria is satisfied, for example if their selected game has a better outcome than the non-selected games. The player can select one of the games by selecting one of the game displays, for example by touching the game display if the display incorporates a touch screen. In some embodiments, the player may receive different awards depending on the outcome of the comparison of the selected game and the non-selected game(s). For example, the player may receive an award corresponding to the award the player would have received from play of each of the plurality of games if the selected game compares favourably to the non-selected game(s) and only the award for the selected game if the game does not compare favourably.

In a first form, a stand alone gaming machine is provided wherein all or most components to implement the game are present in a player operable gaming machine.

In a second form, a distributed architecture is provided wherein some of the components to implement the game are present in a player operable gaming machine and some of the components to implement the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions, and a speaker 58 for outputting sound effects and the like.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
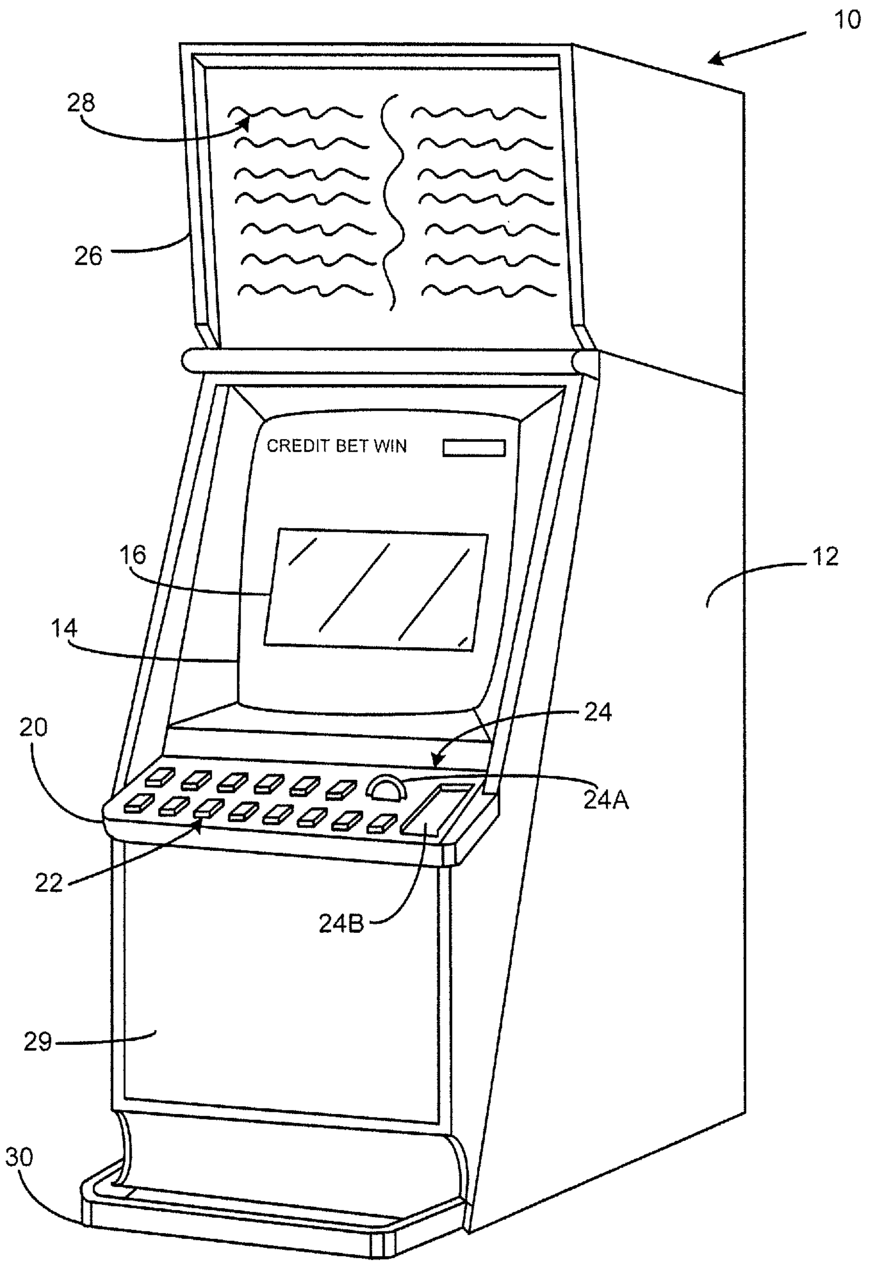
FIG. 2 is a perspective view of a gaming machine.

A gaming system in the form of a stand alone gaming machine 10 is illustrated in FIG. 2. The gaming machine 10 includes a console 12 having a video display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module may be provided having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit. The top box 26 may also include a display, for example a video display unit, which may be of the same type as the display 14, or of a different type.

Figure 3:
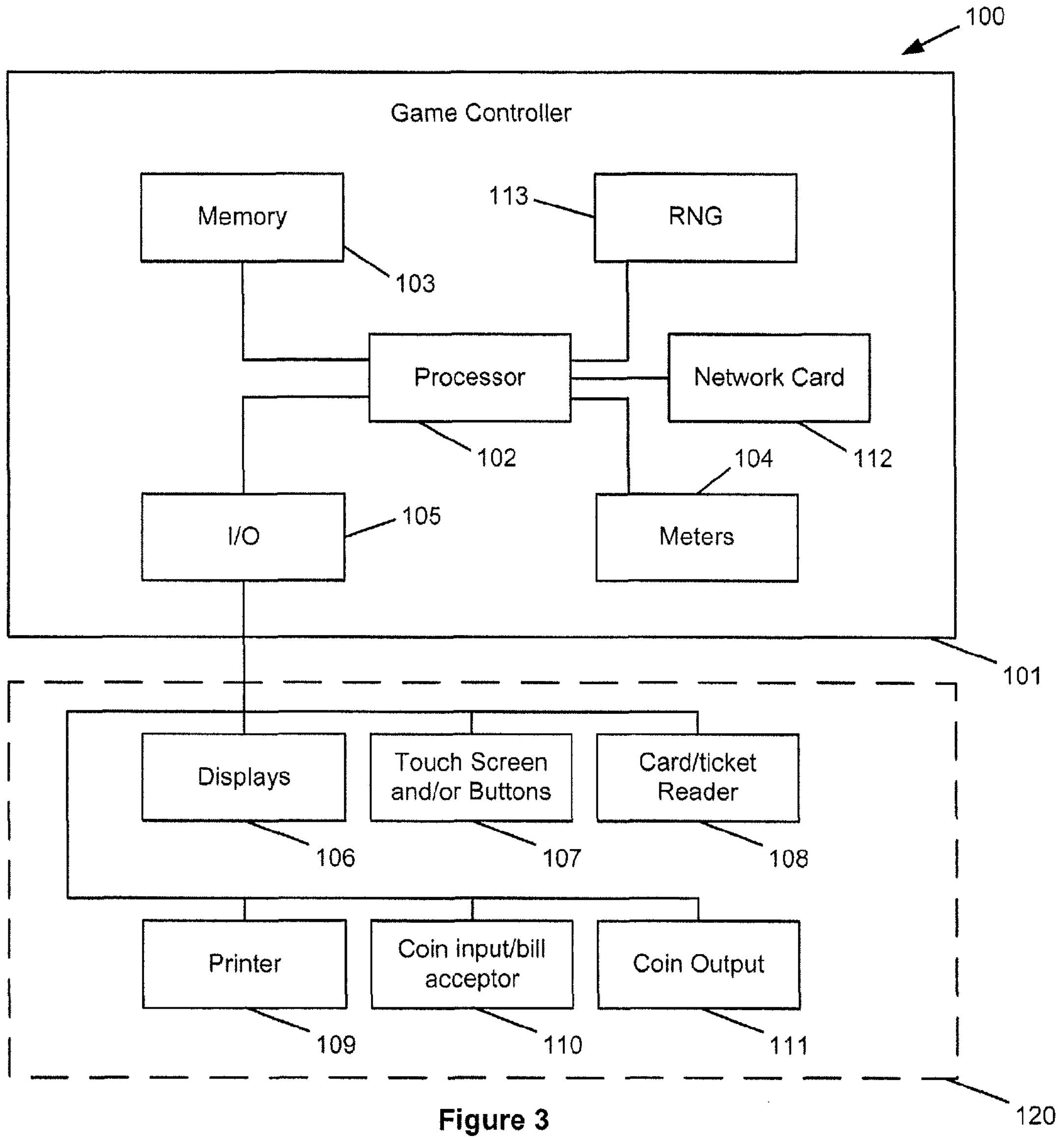
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, buttons and/or a touch screen 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
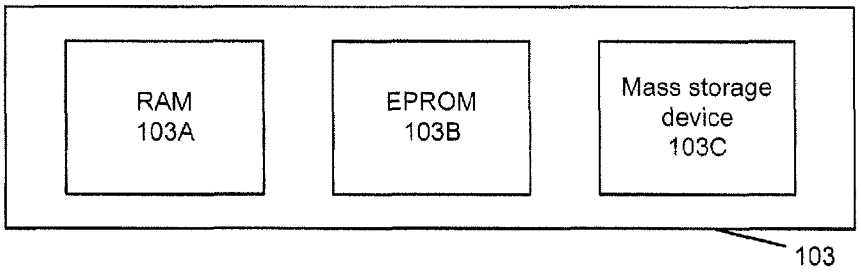
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
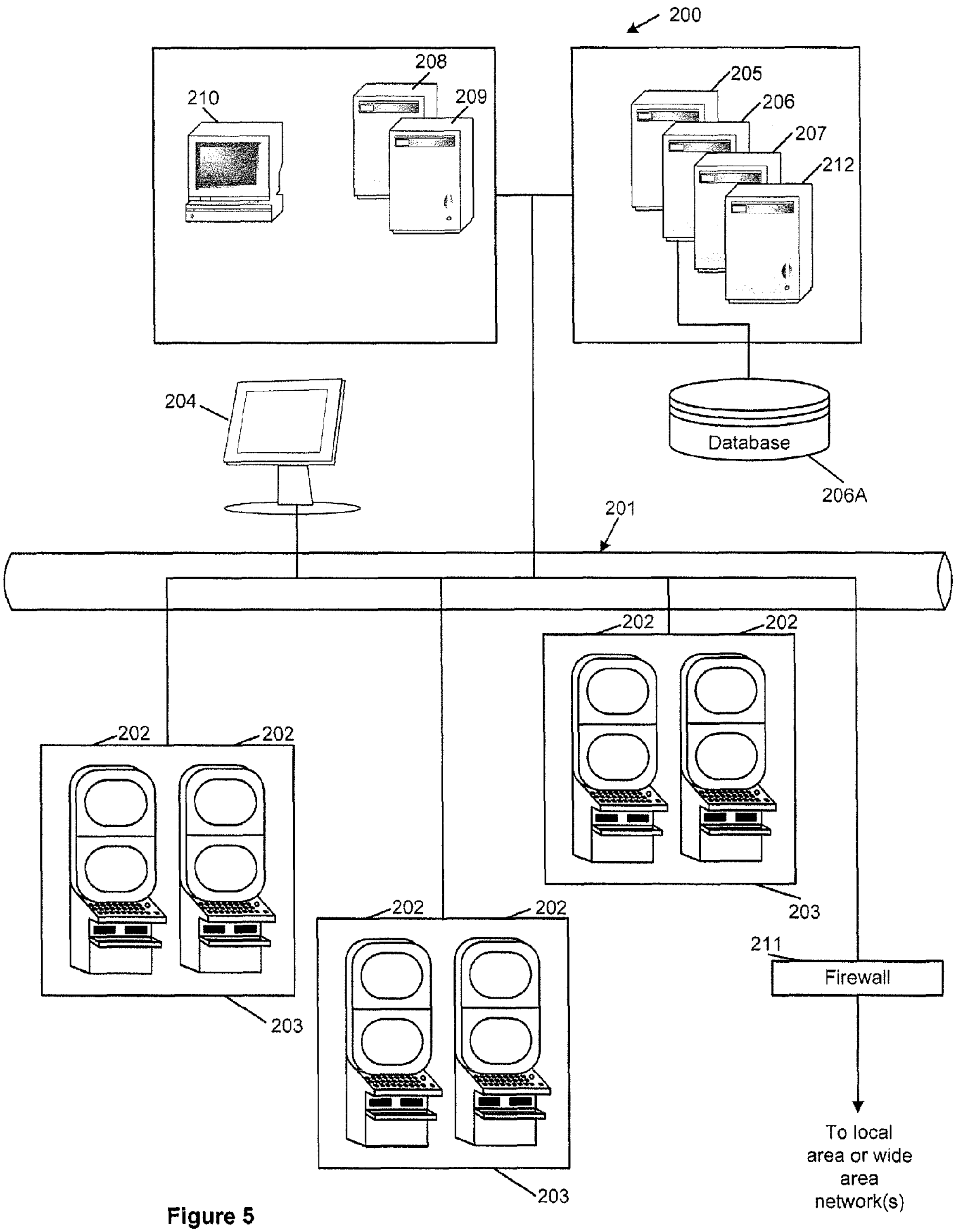
FIG. 5 is a diagram schematic of a networked gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the rules, guidelines, requirements, and/or preferences for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to carry out the accounting in respect of the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games based on the terminals.

DETAILED DESCRIPTION

Figure 6:
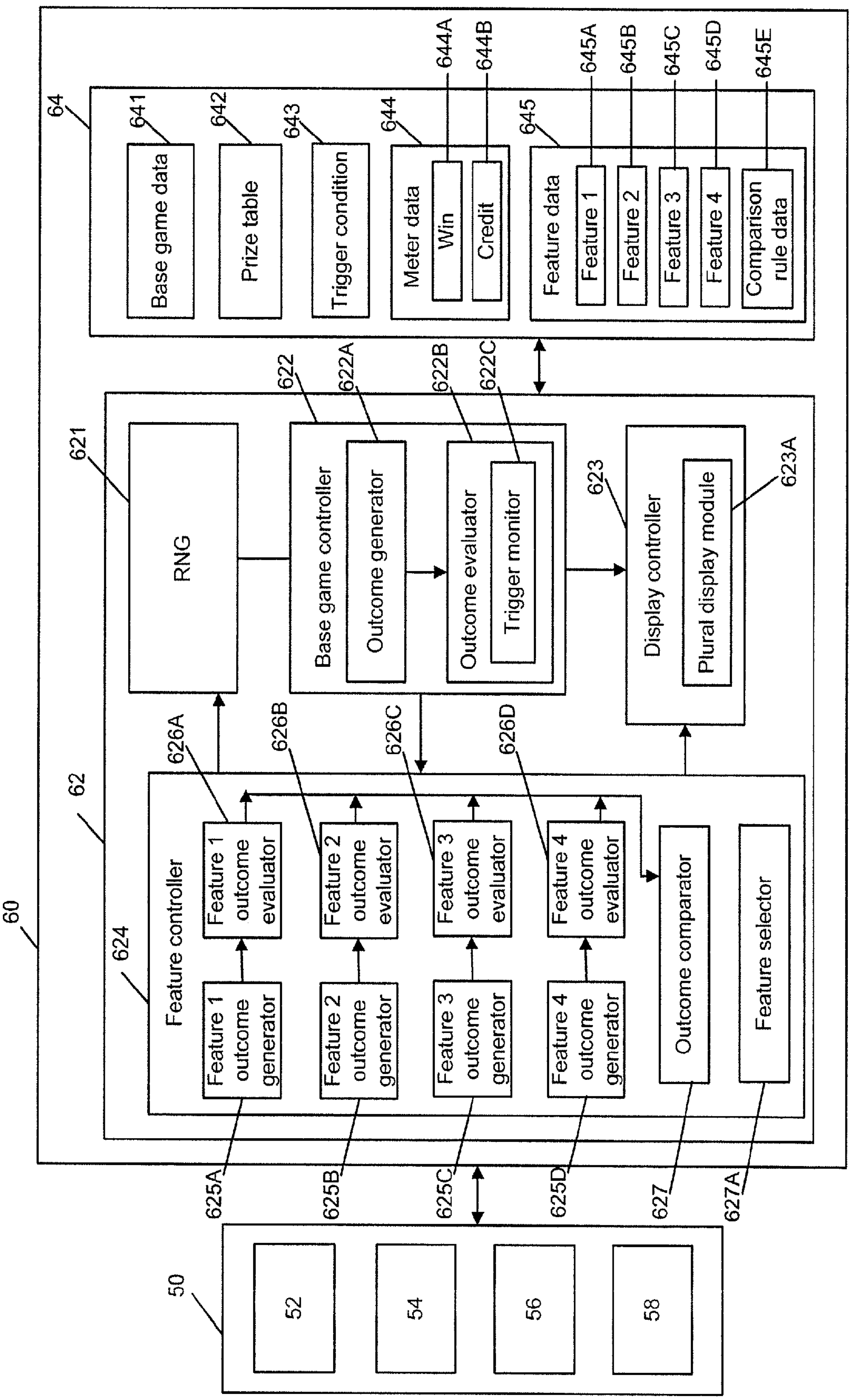
FIG. 6 is a further block diagram of the gaming system.

The game controller 60 of the embodiment is shown in more detail in FIG. 6. It will apparent that the processor 62 implements a number of modules, for example random number generator module 621 by executing software routines. Persons skilled in the art will appreciate that not all modules need be implemented by processor 62. For example, the random number generator module 621 could be implemented by a separate circuit or by a random number generator server.

In the embodiment, both base and feature games are spinning reel type games. The player operates the game play mechanism 56 to specify a wager and hence the win entitlement which will be evaluated for this play of the game and initiate a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of pay lines and are an inherent part of the win entitlement.

Persons skilled in the art will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

The game controller 60 begins play by conducting a base game. The base game is a part of the game which is carried out each time the player makes a wager, typically irrespective of the wager, whereas other parts of the game will only be carried out occasionally for example if a trigger condition is met.

The base game controller 622 has an outcome generator 622A which uses the random number generator 621 to generate an outcome for display on display 54 under control of display controller 623. In the embodiment, the base game data 641 defines the rules of a spinning reel game including the symbols which may be selected an accordingly defines a set of virtual spinning reels. Accordingly the outcome generator 622A selects, for example by selecting stop positions for each reel, symbols for display on display 54. The outcome evaluator 622B takes the player's winning entitlement, e.g. the lines or reels they are playing, and compares these against the selected symbols and the prize table (pay table) to determine what awards to make (if any). Any awards are added to the win meter 644A of meter data 644. When the player commences another play of the game the balance of the win meter will be transferred to the credit meter 644B. The win meter can also be transferred to the credit meter in other circumstances including when the player indicates they wish to cash out.

In the embodiment, the game controller has a trigger monitor 622C which monitors game play to determine that a trigger condition 643 has occurred and hence that the feature games should commence. In the embodiment, the trigger condition is the occurrence of specific symbols in the game.

In other embodiments, the feature games can be triggered by any of the known methods including but not limited to:

a random occurrence related to turnover or time;

a machine event;

a trigger received from an external device;

a system event;

a condition initiated by an operator; or a decision by a player.

Eligibility for the feature can include the following:

always available;

available whenever a special symbol(s) appears in the window;

a player can choose to purchase the feature; or a player can choose to purchase the feature subject to a threshold condition.

Figure 8A:
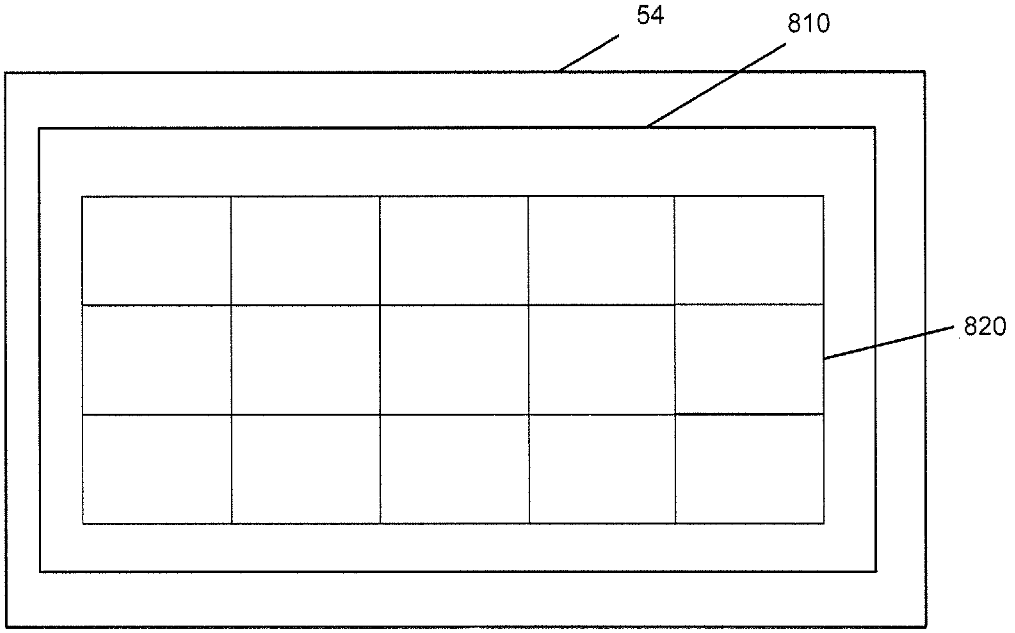
FIGS. 8A and 8B are examples showing how the video display is modified to display plural game displays.
Figure 8B:
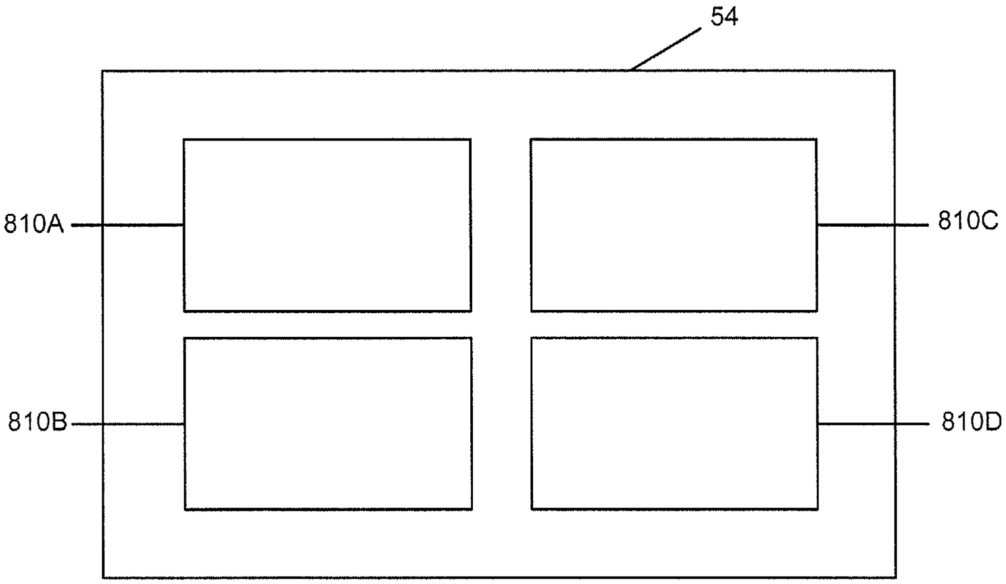

Once the trigger monitor 622C has determined that a trigger condition 643 has been met, control is passed to the feature controller 624. The feature controller causes display controller to generate the plural display module 623A. Accordingly, the display changes from the display shown in FIG. 8A where, in an example, fifteen symbols are displayed in five columns and three rows corresponding to five reels 820 in display area 810 on display 54 to an alternative view where four smaller display areas 810A to 810D are provided on the display. In the example, each of the feature games is to be a spinning reel game as described above in the form of a different number of free games to be provided to the player using the same rules as the base game (that is where a plurality of game rounds are conducted, each involving the reels being spun and the selected symbols evaluated). For each game a different multiplier will apply. Accordingly feature game data 645 specifies data for each feature, namely Feature 1 645A, Feature 2 645B, Feature 3 645C, and Feature 4 645D which specifies the number of games and the multiplier which will apply. In an example, feature game 1 is 20 free games with no multiplier; feature game 2 is 15 free games with prizes doubled, feature game 3 is 10 free games with prizes tripled and the feature game 4 is 5 free games with prizes quadrupled.

Information regarding these games is displayed to the player in the different display areas so the player can select one of the feature games. For example, by pressing a button of game play mechanism 56 associated with the respective one of the features or touching one of the display areas.

Accordingly, the feature controller includes as a feature selector 627A for receiving the player selection. Once the player selection is received the feature selector 627A causes the plural display module 623A to alter the display 54 to highlight which of the display areas has been selected and hence which of the games has been selected, for example by greying out the non-selected games or providing a coloured border around the selected game. The feature controller 624 then commences each of the feature games.

In alternative embodiment, or if a player does not make a selection within a defined time period, the feature selector 627A, randomly selects one of the features (using random number generator 621).

Once the feature commences each of feature outcome generators 625A, 625B, 625C and 625D independently generates game outcomes using values obtained from random number generator 621. As illustrated in FIG. 6, each of these is independently evaluated by feature outcome evaluators 626A, 626B, 626C and 626D. This includes each feature outcome evaluator 626 maintaining a total of the awards won for the relevant series of games.

After all of the feature games have been completed, the total awards are provided to the outcome comparator 627 which determines whether to make an additional award to the player based on the comparison rule data 645E. In one example, the comparison rule data 645 specifies that the player receives an additional prize if the feature they selected has the highest prize outcome in credits. The player also receives the award for the feature game they selected. Both awards are added to win meter 644A.

A person skilled in the art will appreciate the number of other embodiments are possible, for example, the comparison rule data 645E could specify a series of different awards depending on the ranking of the feature game (e.g. prizes for first and second place). Further, there might be some outcomes in which the player loses the awards from the feature game they played, for example, if their feature game produced the lowest score. Other embodiments will be apparent to persons skilled in the art.

A person skilled in the art will appreciate that while in the embodiment the plural feature games are shown as all being spinning reel type games, however the games could be different. For example, one game could be a spinning reel type game, another game could be a card game and a third game could be a dice game.

Desirably, each of the games should have similar or the same return to player such that there is no advantage to making a particular selection but in some embodiments it may be desirable to have different returns to players.

In the embodiment, the plural games are shown as being conducted as a feature game in response to a trigger condition being met such that a player only makes a selection in plays of the game where the feature is triggered. However, in some embodiments the plural games may be conducted in each game such that the player always makes a selection. In such embodiments, the player may be required to obtain eligibility, for example by placing an ante-bet or playing all lines.

Further, in the above embodiment the same evaluation is described as being applied to each of the feature games. In other embodiments, different evaluations could be applied depending on the game.

Figure 7:
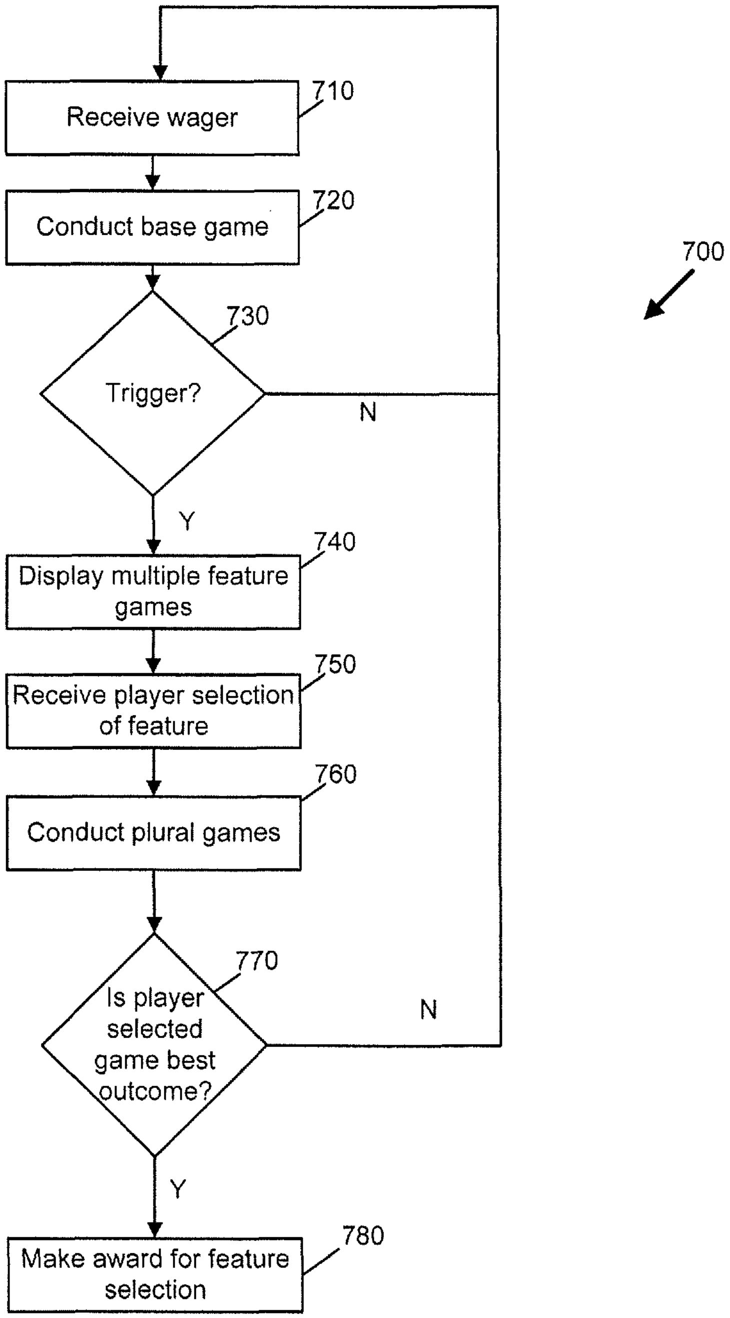
FIG. 7 is a flowchart of an embodiment.

The method of an embodiment is shown in FIG. 7. The method 700 involves receiving a wager 710 and conducting a base game 720. It is determined 730 whether a trigger condition is met. When no trigger is met, the game waits on a further trigger. When a trigger occurs, the plural display module 623A alters the display 54 to display multiple feature games. A player selection is received 750 and all the feature games are conducted 760. It is then determined 770 whether the player selected game has the best outcome and if this is the case an additional award 780 is made for making that selection.

In another embodiment, the gaming system conducts four different spinning reel games and each of the outcome evaluators 626 for occurrence of a designated event in the game to determine an outcome of the game. The outcome evaluators 626 also monitor what awards are made in each of the games so that these awards can be used as the basis of the award made in response to the comparison of the outcomes of the selected and non-selected games. As described above, the player selects a game and the game controller carries out a plurality of game rounds. In this example, the number of game rounds is the same for each game.

In the embodiment, the designated event is the occurrence of a designated symbol specific to the spinning reel game such that in the different games there are different symbols. For example, the four symbols may represent four competing characters. The outcome evaluators 626 keep a running total of the number of the designated symbols which have occurred for the respective game as each of the game rounds is conducted. At the same time, total awards for each game are kept. That is, in each game round for each game, the selected symbols which are displayed are evaluated: a) for the occurrence of designated symbols; and b) by comparison with the pay table of the game to determine what award in credits applies to the selected symbols.

In the embodiment the comparison of outcomes is conducted after all of the game rounds have been conducted. The comparison is between the total number of designated symbols in the selected game over the plurality of game rounds and the total number of designated symbols in the non-selected games. In the embodiment, the player wins an award corresponding to the total award from each of the games upon the number of symbols in the player's game being greater than the total number of symbols in each of the three non-selected games. Otherwise, the player wins the award from the selected game. Viewed from another perspective, the player can win a bonus award corresponding to the awards from the three non-selected games.

It will be appreciated that other comparisons can be made by the game controller 60 so as to apply alternative award criteria. For example, the award criteria could be that the player's selected game results in the greatest number of symbols or a function of the symbols which occur in the non-selected games. For example, better than the average or the other games, twice the highest total in the other games, twice the average in the other games, more than N symbols greater than the next highest total etc.

Persons skilled in the art will appreciate that other game events could be monitored for the purpose of subsequent comparison, such as the number of a particular combination of symbols, the number of winning combinations, the number of a plurality of different designated symbols etc.

A person skilled in the art will also appreciate that the games in the plural display areas can be compared in different ways. For example, rather than the credit prizes being compared as described above the game which returns the largest individual prize in any one of the series games could be declared the winning game outcome. In another embodiment, the number of a certain types of symbols collected during a game could be used to determine a winning outcome. Various other modifications will be apparent to a person skilled in the art.

Persons skilled in the art will appreciate that a feature game involves some additional element of game play which only occurs when a trigger condition is met. Types of feature games include: those where a series of free game events are awarded such as free games or re-spins (where some reels are held while others are re-spun); games where the symbols on the reel are changed; and "second screen" games where game play is totally different to the base game, for example where the player makes selections in a "pick a box type" game.

Further aspects of the method will be apparent from the above description of the gaming system and that at least part of the method will be implemented digitally by a processor. Persons skilled in the art will also appreciate that the method could be embodied in program code. The program code could be supplied in a number of ways, for example on a computer readable storage medium, such as a disc or a memory (for example, that could replace part of memory 103) or as a data signal (for example, by transmitting it from a server). Persons skilled in the art will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A gaming system comprising:

a display; and a game controller arranged to:

cause the display to display a plurality of game displays in which a plurality of instances of a game will be carried out simultaneously;

receive a player selection of an instance of the plurality of instances of the same game;

carry out the plurality of instances of the game in their respective game displays, wherein each instance of the game comprises a plurality of game rounds in which a plurality of symbols are selected from a set of symbols to be displayed in their respective game displays, at least one symbol of the set of symbols being a designated symbol, wherein in each game round for each instance of the game, the selected symbols that are displayed are evaluated for the occurrence of designated symbols; and make an award upon a comparison of a total number of designated symbols occurring across the plurality of game rounds of the player selected instance with a total number of designated symbols occurring across the plurality of game rounds of all non-selected instances satisfying an award criteria.

2. A gaming system as claimed in claim 1, wherein the award criteria is that a prize total related to the selected instance is greater than the prize total related to each of the other instances.

3. A gaming system as claimed in claim 1, wherein each of the instances is different.

4. A gaming system as claimed in claim 3, wherein each of the different instances has a different volatility.

5. A gaming system as claimed in claim 4, wherein the trigger event is one or more of:

an occurrence of a specific symbol or symbols;

a random occurrence related to turnover or time;

a machine event;

a trigger received from an external device;

a system event;

a condition initiated by an operator;

a decision by a player; or an additional bet by a player.

6. A gaming system as claimed in claim 1, wherein the game controller carries out at least one of the plurality of instances by conducting a series of game rounds.

7. A gaming system as claimed in claim 1, wherein the game controller carries out the plurality of game rounds for each of the instances.

8. A gaming system as claimed in claim 1, wherein the game controller carries out the same number of game rounds for each instance.

9. A gaming system as claimed in claim 1, wherein each of the instances comprises a spinning reel game, each game round comprises a spin of the reels.

10. A gaming system as claimed in claim 1, wherein the comparison is to determine whether the number of designated symbols in the selected instance is greater than in respective ones of each of the non-selected instances.

11. A gaming system as claimed in claim 1, wherein the comparison is to determine whether the number of designated symbols in the selected instance is greater than a combined number of designated symbols in the non-selected instances.

12. A gaming system as claimed in claim 1, wherein the game controller is further arranged to evaluate each game round of each instance relative to a pay table of the respective instance to determine any amount which payable based on the pay table and upon the award criteria being met, make an award corresponding to the total amount payable in respect of each of the instances.

13. A gaming system as claimed in claim 1, wherein there are a plurality of award criteria which may be satisfied and different awards correspond to different criteria.

14. A gaming system as claimed in claim 13, wherein the game controller is arranged to make an award corresponding to the total amount payable in respect of the player selected instance upon a second award criteria being met.

15. A gaming system as claimed in claim 1, wherein the game controller is arranged to cause the plurality of game displays to be displayed in response to a trigger condition being met.

16. A gaming system as claimed in claim 1, comprising a memory and a processor arranged to implement the game controller by executing program instructions stored in the memory.

17. A gaming system as claimed in claim 1, comprising a game play mechanism operable to place a wager, to initiate play and make the player selection of a game display.

18. A gaming system as claimed in claim 1, wherein no award is made in response to the total number of designated symbols of any one the non-selected instances being greater than the total number of designated symbols of the player-selected instance.

19. A game controller for a gaming system, the game controller arranged to:

cause the display to display a plurality of game displays in which a plurality of instances of a game will be carried out simultaneously;

receive a player selection of an instance of the game;

carry out the plurality of instances of the game and cause them to be displayed in their respective game displays, wherein each instance of the game comprises a plurality of game rounds in which a plurality of symbols are selected from a set of symbols to be displayed in their respective game displays, at least one symbol of the set of symbols being a designated symbol, wherein in each game round for each instance of the game, the selected symbols which are displayed are evaluated for the occurrence of designated symbols; and make an award upon a comparison of a total number of designated symbols occurring across the plurality of game rounds of the player selected instance with a total number of designated symbols occurring across the plurality of game rounds of all non-selected instances satisfying an award criteria.

20. A game controller as claimed in claim 19, comprising a display controller for controlling the display to display a plurality of game displays.

21. A game controller as claimed in claim 19, comprising an award comparator for comparing the total number of designated symbols of the player selected instance with the total number of designated symbols of the non-selected instances to determine whether the award criteria is satisfied.

22. A game controller as claimed in claim 19, wherein the award criteria is that a prize total related to the selected instance is greater than the prize total related to each of the other instances.

23. A game controller as claimed in claim 19, wherein each of the instances is different.

24. A game controller as claimed in claim 23, wherein each of the different instances has a different volatility.

25. A game controller as claimed in claim 19, wherein the game controller carries out at least one of the plurality of instances by conducting a series of game rounds.

26. A game controller as claimed in claim 19, wherein the game controller carries out the plurality of game rounds for each of the instances.

27. A game controller as claimed in claim 26, wherein the game controller carries out the same number of game rounds for each instance.

28. A game controller as claimed in claim 19, wherein each of the instances comprises a spinning reel game, each game round comprises a spin of the reels.

29. A game controller as claimed in claim 19, wherein the comparison is to determine whether the number of designated symbols in the selected instance is greater than in respective ones of each of the non-selected instances.

30. A game controller as claimed in claim 19, wherein the comparison is to determine whether the number of designated symbols in the selected instance is greater than a combined number of designated symbols in the non-selected instances.

31. A game controller as claimed in claim 19, wherein the game controller is further arranged to evaluate each game round of each instance relative to a pay table of the respective instance to determine any amount which payable based on the pay table and upon the award criteria being met, make an award corresponding to the total amount payable in respect of each of the instances.

32. A game controller as claimed in claim 19, wherein there are a plurality of award criteria which may be satisfied and different awards correspond to different criteria.

33. A game controller as claimed in claim 32, arranged to make an award corresponding to the total amount payable in respect of the player selected instance upon a second award criteria being met.

34. A game controller as claimed in claim 19, arranged to cause the plurality of game displays to be displayed in response to a trigger condition being met.

35. A game controller as claimed in claim 34, wherein the trigger event is one or more of:

an occurrence of a specific symbol or symbols;

a random occurrence related to turnover or time;

a machine event;

a trigger received from an external device;

a system event;

a condition initiated by an operator;

a decision by a player; or an additional bet by a player.

36. A method of electronic gaming comprising:

causing, using a processor, an electronic display to display a plurality of game displays in which a plurality of instances of a game will be carried out simultaneously;

receiving, using the processor, a player selection of an instance of the plurality of instances of the same game;

carrying out, using the processor, the plurality of instances of the game in their respective game displays, wherein each instance of the game comprises a plurality of game rounds in which a plurality of symbols are selected from a set of symbols to be displayed in their respective game displays, at least one symbol of the set of symbols being a designated symbol, wherein in each game round for each instance of the game, the selected symbols which are displayed are evaluated for the occurrence of designated symbols; and making, using the processor, an award upon a comparison of a total number of designated symbols occurring across the plurality of game rounds of the player selected game with a total number of designated symbols occurring across the plurality of game rounds of all non-selected instances satisfying an award criteria.

37. A method as claimed in claim 36, wherein the award criteria is that a prize total related to the selected instance is greater than the prize total related to each of the other instances.

38. A method as claimed in claim 36, wherein each of the instances is different.

39. A method as claimed in claim 38, wherein each of the different instances has a different volatility.

40. A method as claimed in claim 36, comprising carrying out at least one of the plurality of instances by conducting a series of game rounds.

41. A method as claimed in claim 36, comprising carrying out the plurality of game rounds for each of the instances.

42. A method as claimed in claim 41, comprising carrying out the same number of game rounds for each instance.

43. A method as claimed in claim 36, wherein each of the instances comprises a spinning reel game, each game round comprises a spin of the reels.

44. A method as claimed in claim 36, wherein the comparison comprises determining whether the number of designated symbols in the selected instance is greater than in respective ones of each of the non-selected instances.

45. A method as claimed in claim 36, wherein the comparison comprises determining whether the number of designated symbols in the selected instance is greater than a combined number of designated symbols in the non-selected instances.

46. A method as claimed in claim 36, comprising evaluating each game round of each instance relative to a pay table of the respective instance to determine any amount which payable based on the pay table and upon the award criteria being met, making an award corresponding to the total amount payable in respect of each of the instances.

47. A method as claimed in claim 36, wherein there are a plurality of award criteria which may be satisfied and different awards correspond to different criteria.

48. A method as claimed in claim 47, comprising making an award corresponding to the total amount payable in respect of the player selected instance upon a second award criteria being met.

49. A method as claimed in claim 36, comprising causing the plurality of game displays to be displayed in response to a trigger condition being met.

50. A method as claimed in claim 49, wherein the trigger event is one or more of:

an occurrence of a specific symbol or symbols;
a random occurrence related to turnover or time;
a machine event;
a trigger received from an external device;
a system event;
a condition initiated by an operator;
a decision by a player; or
an additional bet by a player.

51. A non-transitory computer readable storage medium comprising computer program code which when executed by a processor implements a method of electronic gaming comprising:

causing an electronic display to display a plurality of game displays in which a plurality of instances of a game will be carried out simultaneously;

receiving a player selection of an instance of the plurality of instances of the same game;

carrying out the plurality of instances of the game in their respective game displays, wherein each instance of the game comprises a plurality of game rounds in which a plurality of symbols are selected from a set of symbols to be displayed in their respective game displays, at least one symbol of the set of symbols being a designated symbol, wherein in each game round for each instance of the game, the selected symbols which are displayed are evaluated for the occurrence of designated symbols; and making an award upon a comparison of a total number of designated symbols occurring across the plurality of game rounds of the player selected game with a total number of designated symbols occurring across the plurality of game rounds of all non-selected instances satisfying an award criteria.

* * * * *